US010146859B2

(12) United States Patent
Ng Tari et al.

(10) Patent No.: US 10,146,859 B2
(45) Date of Patent: Dec. 4, 2018

(54) SYSTEM AND METHOD FOR ENTITY RECOGNITION AND LINKING

(71) Applicant: GENERAL ELECTRIC COMPANY, Schenectady, NY (US)

(72) Inventors: Luis Babaji Ng Tari, Glenville, NY (US); Varish Vyankatesh Mulwad, Glenville, NY (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 15/153,788

(22) Filed: May 13, 2016

(65) Prior Publication Data

US 2017/0329842 A1  Nov. 16, 2017

(51) Int. Cl.
*G06F 17/30* (2006.01)
*G06F 3/0484* (2013.01)
*G06F 17/27* (2006.01)

(52) U.S. Cl.
CPC .... *G06F 17/30684* (2013.01); *G06F 3/04842* (2013.01); *G06F 17/278* (2013.01)

(58) Field of Classification Search
CPC .......................... G06F 3/4842; G06F 17/30684
USPC ......................................................... 707/728
See application file for complete search history.

(56) References Cited

U.S. PATENT DOCUMENTS

| 8,140,578 | B2 | 3/2012 | Johnson et al. |
| 9,223,833 | B2 | 12/2015 | Lightner et al. |
| 9,229,988 | B2 | 1/2016 | Vadrevu et al. |
| 2008/0052262 | A1 | 2/2008 | Kosinov et al. |
| 2008/0195601 | A1 | 8/2008 | Ntoulas et al. |
| 2014/0040274 | A1 | 2/2014 | Aravamudan et al. |
| 2014/0142922 | A1 | 5/2014 | Liang et al. |
| 2015/0154316 | A1 | 6/2015 | Lightner et al. |
| 2016/0048773 | A1 | 2/2016 | Kapur et al. |

FOREIGN PATENT DOCUMENTS

WO         2015/006254 A2        1/2015

OTHER PUBLICATIONS

Collins et al., "Unsupervised Models for Named Entity Classification", Proc. Joint SIGDAT Conf. Empirical Methods in Natural Language Processing and Very Large Corporapp. 100-110, 1999.
Elmagarmid et al., "Duplicate record detection: A survey", IEEE Trans. Knowl. Data Eng., vol. 19, pp. 1-16, 2007.
McNamee, "HLTCOE efforts in entity linking at TAC KBP 2010", Proc. Text Anal. Conf. Workshop, pp. 1-7, 2010.

(Continued)

*Primary Examiner* — Shahid A Alam
(74) *Attorney, Agent, or Firm* — GE Global Patent Operation; Pabitra Chakrabarti

(57) ABSTRACT

According to one embodiment, a method for text analysis is provided. The method includes recognizing a concept. Recognizing a concept includes receiving a stream of text including a plurality of entities, and extracting at least one concept from the plurality of entities. The method also includes disambiguating the at least one extracted concept. Disambiguating the at least one extracted concept includes receiving the at least one extracted concept, and generating at least one disambiguated concept corresponding to the at least one extracted concept.

15 Claims, 4 Drawing Sheets

(56) References Cited

OTHER PUBLICATIONS

Chen et al., "Cuny-blender TAC-KBP2010 entity linking and slot filling system description" Proc. Text Anal. Conf. Workshop, pp. 1-17, 2010.
Li et al., "Incorporating User Feedback into Name Disambiguation of Scientific Cooperation Network", Conference: Web-Age Information Management—12th International Conference, WAIM 2011, Wuhan, China, pp. 454-466, Sep. 2011.
Shen et al., "Entity Linking with a Knowledge Base: Issues, Techniques, and Solutions", Knowledge and Data Engineering, IEEE Transactions on, vol. 27, Issue 2, pp. 443-460, 2015.
Grishman, "Information Extraction", Intelligent Systems, IEEE, vol. 30, Issue 5, pp. 8-15, 2015.
Finkel, J.R. et al., "Incorporating non-local information into information extraction systems by Gibbs sampling," Proceedings of the 43rd Annual Meeting on Association for Computational Linguistics, pp. 363-370, (Jun. 2005).
Kuperus, J. et al., "Increasing NER Recall with Minimal Precision Loss," European Intelligence and Security Informatics Conference (EISIC), pp. 106-111, (Aug. 2013).
International Search Report and Written Opinion issued in connection with corresponding PCT Application No. PCT/US2017/031698 dated Aug. 23, 2017.

SYSTEM AND METHOD FOR ENTITY RECOGNITION AND LINKING

BACKGROUND

The present invention generally relates to analysis of text received from various sources, and more specifically to detection and validation of concepts extracted from entities embedded in unstructured text.

One of the challenges for text analytics is the identification of terms with ambiguous meaning, known as entity recognition and entity linking. For example, performance of a text analytics system can be negatively impacted by ambiguous terms such as Michael Jordan (basketball player or the famous UC Berkley professor), back (as a body part or a preposition) and US (Ultrasound or United States) that appear in text. Typical entity recognition and entity linking approaches rely on manually labeling text to train the systems for recognizing terms from text and then linking the terms to the right concepts. Such text-based training can be expensive to compile, and updates to the system depend on technical users such as software developers to re-train and enhance the entity recognition and linking systems. Everyday users of these systems ultimately play a passive role in the ecosystem. Particularly in the field of medicine, the users themselves (clinicians) have the most relevant insight into the appropriate use of ambiguous terms and they are not integrated into the development of systems and methods currently. Further, the terms and conventions can also vary widely from application to application, so it is important to allow the system to evolve within the environment where it is used.

There is need to improve the efficiency and relevance of the method and systems associated with text analysis.

BRIEF DESCRIPTION

In accordance with one aspect of the invention, a method of text analysis comprises recognizing a concept, disambiguating the at least one extracted concept and capturing user feedback. Recognizing a concept comprises receiving a stream of text comprising a plurality of entities, and extracting at least one concept from said plurality of entities. Disambiguating the at least one extracted concept, comprises receiving said at least one extracted concept, and generating at least one disambiguated concept corresponding to said at least one extracted concept. Capturing user feedback comprises receiving the at least one disambiguated concept, validating said disambiguated concept with a first manual input received from a user, generating at least one of: a retained concept and a discarded concept, receiving a second manual input from the user, and adding said retained concept to at least one of: said plurality of positive example concepts and said plurality of negative example concepts, based on said second manual input.

In accordance with another aspect of the invention, a system for text analysis comprises a concept recognition module configured to receive a stream of text comprising a plurality of entities, and extract at least one concept from said plurality of entities. The system also comprises a concept disambiguation module independently coupled to said concept recognition module and configured to receive and disambiguate said at least one extracted concept, and generate at least one corresponding disambiguated concept.

In accordance with another aspect of the invention, a non-transitory, computer-readable medium storing instructions that, when executed by a computer processor, cause the computer processor to perform a method of text analysis comprising recognizing a concept, disambiguating the at least one extracted concept, and capturing user feedback. Recognizing a concept comprises receiving a stream of text comprising a plurality of entities, and extracting at least one concept from the plurality of entities. Disambiguating the at least one extracted concept, comprises receiving the at least one extracted concept, and generating at least one disambiguated concept corresponding to the at least one extracted concept, wherein the generating at least one disambiguated concept comprises computing a confidence score signifying a likelihood of correctness of the at least one extracted concept, and further wherein the computing a confidence score comprises incorporating a comparison with each of: the plurality of positive example concepts and the plurality of negative example concepts, wherein the disambiguating the at least one extracted concept comprises comparing the at least one extracted concept with each of: a plurality of positive example concepts, and a plurality of negative example concepts. Capturing user feedback comprises receiving the at least one disambiguated concept, validating the disambiguated concept with a first manual input received from a user, and generating at least one of: a retained concept and a discarded concept.

DRAWINGS

Embodiments described herein will become better understood when the following detailed description is read with reference to the accompanying drawings in which like characters represent like parts throughout the drawings, wherein.

DETAILED DESCRIPTION

Figure 1:
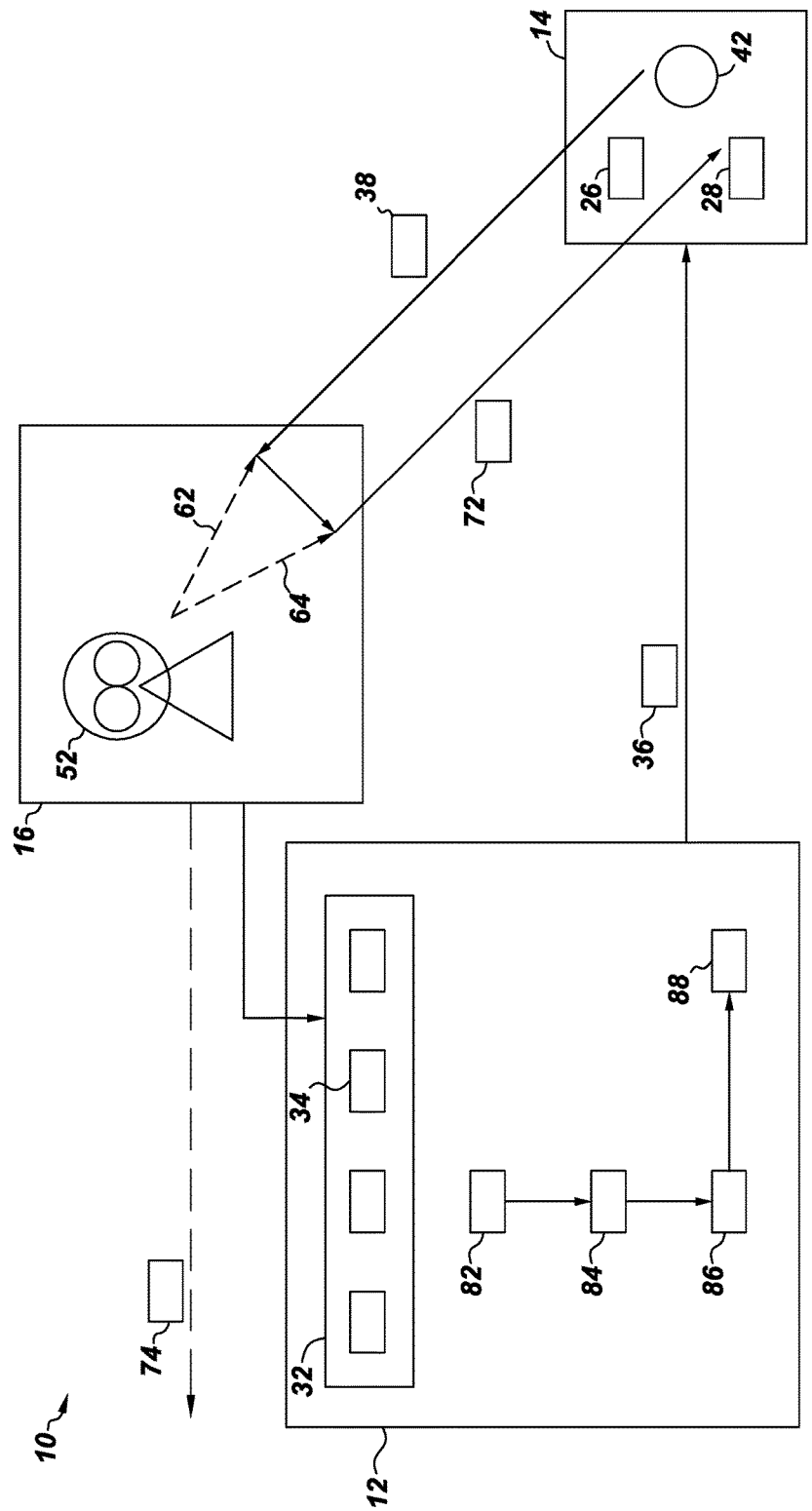
FIG. 1 illustrates a system of text analysis in accordance with one embodiment of the present invention.

Example embodiments are described below in detail with reference to the accompanying drawings, where the same reference numerals denote the same parts throughout the drawings. Some of these embodiments may address the above and other needs. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Existing approaches to entity recognition and entity linking can be broadly categorized into dictionary-based, supervised, semi-supervised and active learning approaches. Dictionary-based techniques are the predominant approaches to identify entity recognition and linking. In addition to performing an exact match between keywords in dictionary and target text, an extension of dictionary-based approaches typically includes partial matching such as and heuristics such as to comprehend name variations and abbreviations for entities. Supervised learning approaches label data to learn sequential models that capture the neighboring features of the entities in order to recognize entities. Semi-supervised approaches require a small seed of labeled examples and iteratively generalize to recognize entities. Active learning approaches require a small seed of labeled examples, but the algorithm would prompt the users for the most uncertain cases in order to improve the entity recognition and entity linking process.

Problem often arises when any of the existing approaches is applied in typical industrial applications, where the data or texts are frequently free-form and lacks standardized structures that would enable valuable downstream analysis. In the context of medical applications as a non-limiting example, much of the information is natural language text entered manually by care providers, and even structured fields are often site-configurable, meaning that concepts found in one data system are not always represented identically in others. A prime example in medical applications are the clinical documents housed in the electronic medical records—specifically office visits, inpatient progress notes, specialist consults, or other subjective assessments of a clinician's encounter with a patient.

It is important to analyze natural language text effectively to provide insights or transform the content into a structured form for better visualization and analysis. The problem of dealing with ambiguous terms while analyzing unstructured text is a common problem encountered by most entity recognition and entity linking algorithms. One approach to dealing with this challenge is modifying and improving the entity recognition and linking algorithms. However, modifying the original source code requires a significant amount of time as well as deep technical expertise. With an advent of off-the-shelf concept recognition algorithms, people with limited technical experience are able to leverage such systems. However, updating such systems would require compilation of labeled data to perform training and update the systems.

In one embodiment of the present invention, this problem is solved by providing a mechanism to effectively update the concept recognition and linking algorithms by means of user feedback. This mechanism eliminates the need to compile new training datasets to cover additional terms, and decreases reliance on developers to update the system. In another embodiment of the present invention, terms or entities are identified from text and assigned appropriate concepts in software applications with user feedback to continuously improve the entity recognition and entity linking capabilities. Further, in yet another embodiment of the present invention, a method is described that identifies, extracts and disambiguates extracted concepts from unstructured text, and enables the primary software users to actively provide feedback on terms used to train the system. The disambiguation module, in accordance with one embodiment of the present invention, updates and learns from these examples to assist in improving the tagging process. In another embodiment of the invention, identification of medical concepts from text corpora such as clinical documents involves the use of a feedback-based mechanism with the medical ontologies as the basis for entity recognition. Throughout this description, an entity is referred as word tokens that collectively indicate a concept in text, while a concept is referred to as a thing in an ontology. An extracted concept corresponds to an entity that links to a particular concept in the ontology.

Turning now to the drawings, FIG. 1 illustrates a system of text analysis in accordance with one embodiment of the present invention. The system for text analysis 10 includes a concept recognition module 12, a concept disambiguation module 14 and a user feedback module 16. The concept recognition module 12 is configured to receive a stream of text 32 comprising a number of entities 34, and extract at least one concept 36 from the number of entities, typically from a user 52.

In a typical example of real life operation, several logically possible entities 34 are automatically identified from an input stream of text 32. For instance, as a non-limiting example, if a text stream ""Musculoskeletal: denies myalgias, back pain, joint pain or falls" is received, automatic identification of entities may be carried out, in one non-limiting example with the help of an ontology that includes most of the concepts related to body parts and their symptoms, or any existing named entity recognition system would do. In the exemplary scenario presented above, the entities that may be automatically identified are: "Musculoskeletal", "myalgias", "back pain", "back", "joint pain", "joint" and so on. Further, "entity linking" automatically maps the entities already identified to the corresponding concepts existing and enlisted in a typical exemplary ontology. For instance, "Muscuoloskeletal" can be mapped to the concept "Muscuoloskeletal" in an exemplary NCIT ontology (http://purl.bioontology.org/ontology/NCIT?conceptid=http%3A%2F%2Fncicb.nci.nih.gov%2Fxml%2Fowl%2FEVS%2FThesaurus.owl%23C25348).

Furthermore, as is explained in more details below, syntactic and semantic features are automatically generated for each entity-to-concept mapping, signified as extracted concepts and the features become the elements of the vector representation for each entity-to-concept mapping. The vectors generated in this way, are automatically compared against any existing positive and negative examples of entity-to-concept mappings. Subsequently, confidence scores are computed to determine the likelihood of the correctness of the mappings. The mappings, thus obtained, are presented to the users, so that the user can validate whether the mapping is correct or not. The user's feedback is then incorporated into the system by updating the disambiguation model, without any need for re-training.

Referring to FIG. 1 again, the concept recognition module 12 includes a text processing component 82 and a feature vector generating component 84. The text processing component 82 is configured to process a number of entities 34 applying a natural language processing technique, and extract the extracted concept 36.

The text processing component 82 typically applies natural to language processing techniques to the input text 32. In one embodiment of the invention, the input stream of text 32 comprises unstructured text. In another embodiment of the invention, the input stream of text 32 comprises structured text received through various web-enabled standard forms. In one situation, the input text 32 often comes in the form of clinical documents such as office notes and progress notes. Only as a non-limiting example, Apache OpenNLP is applied to perform sentence segmentation, tokenization and parts-of-speech tagging, while ClearNLP is used for lemmatization. To recognize concepts from text, UIMA Concept Mapper is used with RadLex and NCI Thesaurus ontologies as the sources for the UIMA Concept Mapper dictionaries. This is achieved by translating the ontologies into UIMA Concept Mapper dictionaries in XML format. Each of the concepts in the ontologies is translated into canonical form and the variants for the dictionary format. Canonical form of a concept is represented by the Uniformed Resource Identifier (URI) of the concept, while its variants include the preferred name and synonyms of the concept. When an entity is identified by the UIMA Concept Mapper, the entity is returned with the corresponding URI so that it can be treated as the mapping between the entities to the particular concept in the ontologies.

Referring to FIG. 1, The feature vector generating component 84 is configured to receive the extracted concept 36 from the text processing component 82, generate feature vector representation 86 corresponding to of the number of entities 34 linked to the extracted concept 36 in terms of a number of features 88 associated with the extracted concept 36, and associate the feature vector representation 86 with of the number of positive example concepts 26 and the number of negative example concepts 28.

In relation to the feature vector generating component 84, as in other vector-based approaches, an entity e that is linked to concept c is associated with a vector representation $x_{e \to c} = <f_1, \ldots, f_d>$, where $f_i$ corresponds to a feature. A vector can represent a positive example or a negative example for concept c. Vectors that correspond to positive examples of c are stored in matrix $P_c$ while negative examples collectively as $N_c$. The feature vector generation component, in one embodiment of the invention, takes the text processing components as input to populate the elements in $x_{e \to c}$.

Further, features used in the context of feature vector generating component 84 can be categorized into syntactic and semantic features. In a typical non-limiting example using Apache OpenNLP, syntactic features may include isAllUppercase and part of speech features. Feature isAllUppercase is for identifying if all of the letters for an extracted entity are in uppercases. Another type of syntactic features are parts-of-speech features, denoted as POS features. Various parts-of-speech tags are considered for POS features nouns (NN), all forms of verbs (VB), prepositions (IN), to (TO), numbers (CD), adjectives (JJ) and adverbs (RB). In addition, the POS features are applied to a window of n word tokens to the left and right of the entity. In this paper, we chose n to be 2. Suppose feature $f_i$ represents the presence of noun for the entity of interest, features $f_{i-2}$ and $f_{i-1}$ refer to occurrences of nouns to the left of the entity, while features $f_{i+1}$ and $f_{i+2}$ correspond to the presence of nouns to the right of the entity. The semantic features include identifying the entity types of the entity and its neighboring word tokens. In particular, entity types that are considered in the semantic features are Imaging Modality (IM), Body Part (BP), Anatomy Modifier (AM), Diagnostic Procedure (DP), Disease and Disorder (DD) and Symptom (SYM). Semantic features are applied to the neighboring word tokens that are within a window of n word tokens from the extracted entity. Further, entities are considered to belong to a particular entity type if the extracted concept is a subclass of a root concept.

Figure 2:
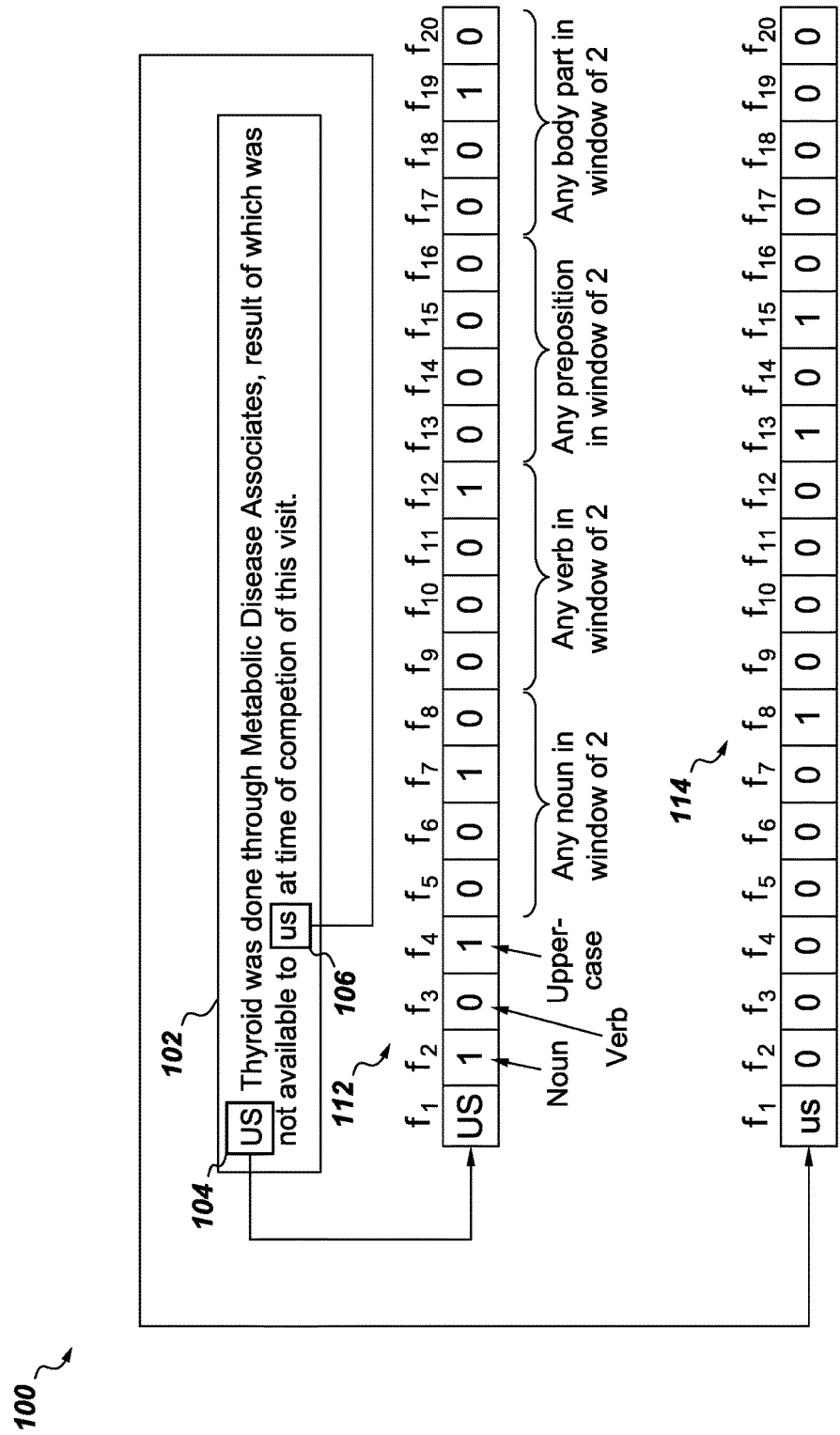
FIG. 2 illustrates a process of feature vector generation process in accordance with one embodiment of the present invention.

FIG. 2 illustrates a typical process 100 of feature vector generation, as effectuated by the feature vector generating component 84 in accordance with one embodiment of the present invention. First exemplary sentence 102 in FIG. 2 shows occurrences of the word tokens "US" 104 and "us" 106. The feature vector generating component 84 identifies the word tokens as entities referring to the concept "Ultrasound" and generates the feature vector 112 for the first entity 104. However, only the first occurrence "US" indeed corresponds to the concept. For the sake of brevity, only the features isAllUppercase, NN, VB, IN, BP are shown in the vector representation for the two entities. Feature f1 for the entity "US" (denoted as x1 in the figure) is assigned as 1 since all letters of the entity are in uppercase letters. Features f2 and f3 correspond to the occurrence of nouns to the left of the entity, while f5 and f6 refer to nouns to the right of entity. Feature f4 corresponds to the occurrence of noun for the entity, and it is marked as 1 since the word token "US" is recognized as a noun by the parts-of-speech tagger. Features f11 corresponds to the verb "was" in the sentence and f19 refers to the entity "thyroid" which is recognized as a body part. In a similar manner, the feature vector generating component 84 generates the second feature vector representation 114 for the entity 106 ("us"), wherein f6 corresponds to the word "time" and f15 refers to the word "at" in the sentence. Finally, feature vector generating component 84 synthesizes the information related various feature vectors 112, 114 and so on into the extracted concept 36 and send that over to concept disambiguation module 14.

Referring back to FIG. 1, the concept disambiguation module 14 is independently coupled to the concept recognition module 12 and is configured to receive and disambiguate the extracted concept 36 from the concept recognition module 12 and generate corresponding disambiguated concept 38. The concept disambiguation module 14 further includes a number of positive example concepts 26 and a number of negative example concepts 28. Each of the positive example concepts 26 and the negative example concepts 28 serve as a reference for comparison with the extracted concept 36. In order to disambiguate the extracted concept 36, the concept disambiguation module 14 computes a confidence score 42 signifying a likelihood of correctness of the extracted concept 36 to generate the corresponding disambiguated concept 38. The confidence score 42 incorporates a comparison with each of the positive example concepts 26 and the negative example concepts 28.

In one embodiment of the invention, the text analysis system 10 computes similarity with the positive and negative example concept scores for matching the most similar positive and negative example concepts 26 and 28 respectively. This similarity is computed using cosine similarity between the extracted concept 36 and each of the positive and negative example concepts 26 and 28 respectively. Specifically, the extracted concept 36 is assigned a confidence score 42 as (positiveScore+(1−negativeScore))/2. If the disambiguation module 14 does not have any information related to the extracted concept, it assigns a score of 1. The confidence scores 42 reflect the likelihood of correctness for the extracted concepts.

To elaborate further the theoretical background, every concept is represented as a vector based on several syntactic and semantic features. Syntactic features include checking whether the surface form of the extracted concept is in uppercase and identifying its part of speech tag, whereas the semantic features include identifying the entity type of the surface form. To capture additional context associated with the concept, feature values are added to vectors via the syntactic and semantic features for words to the left and right of the extracted concept. To compute the confidence scores, the concept vector for the extracted concept is compared against the vectors in the disambiguation module 14.

As mentioned above, one specific goal of computing confidence score 42 is to determine the likelihood for an entity e to be linked correctly to concept c, i.e. the likelihood of correctness for an extracted concept denoted as e→c. This is achieved by comparing e→c with the positive examples $P_c$ and the negative examples $N_c$ that have been collected for concept c in the disambiguation module. Intuitively, the confidence score for e→c is computed based on the level of similarity between e→c and the positive examples in $P_c$ and the level of dissimilarity between e→c and the negative examples in $N_c$. The confidence score computation score (e→c) is characterized by the following formulas:

$$\text{score}(e \to c) = \begin{cases} 1 \text{ if } N_c = \phi \\ \text{conf}(e \to c) \end{cases}$$

$$\text{conf}(e \to c) = w_p \cdot \max_{p \in P_c} \text{similarity}(e \to c, p) + w_n \left(1 - \max_{n \in N_c} \text{similarity}(e \to c, n)\right)$$

In the equation presented above, $w_p$ and $w_n$ correspond to the weights, which are both assigned as 0.5 in a typical experiments. It is important to note and justify the rationale behind score(e→c) assigned as 1 when $N_c=\phi$, i.e. when there are no negative examples associated with concept c. The basis of our approach is to rely on the ontology to identify concepts, and disambiguation is needed only for concepts that can be used in different context. This can be reflected by the existence of negative examples for the concepts of interest, in which a concept with negative examples indicate such concept can be used in multiple context in text. Such behavior is captured in the formulas above so that conf (e→c) is only computed for an extracted concept if negative examples of c have been collected. A high score(e→c) implies that e→c is deemed to be highly similar to one of the positive examples in $P_c$ and highly dissimilar to one of the negative examples in $N_c$. Similarity between the extracted concept and an example is computed based on their corresponding vector representation with the use of cosine similarity defined as follows:

$$\text{similarity}(x, y) = \frac{\vec{x} \cdot \vec{y}}{\|\vec{x}\| \|\vec{y}\|}$$

Referring back to FIG. 1, the text analysis system 10 further decides to retain or discard the extracted concept based on the confidence score 42. If the score is below a certain threshold, the concept can be discarded, else it is retained. For example, "back" is a positive example of body parts, when linked to the concept "Musculoskeletal: denies myalgias, back pain, joint pain or falls". On the other hand a negative example is: "I plan to see him back in 6 months for follow up". In a different context, another positive example is: "US thyroid showed A benign-appearing spongiform nodule within the right" and a corresponding negative example is: "He continues to work for the US Post Office".

In one embodiment of the present invention, once an extracted concept 36 is disambiguated as 38 in the concept disambiguation module 14 with help of confidence score 42, it is important to validate the disambiguated concept 38. While validating a disambiguated concept 38, it is important to integrate a real user into the system and process and receive online user feedback rather than retraining the model. As illustrated in more details below, in one embodiment of the present invention, user feedback is received through user feedback module 16 interactively in order to improve the underlying model for entity recognition and linking. While active learning takes user feedback to help resolve uncertain cases, the method and systems in accordance with one embodiment of the present invention do not require seed labeled examples. Removing the requirement for labeled examples enables users to be responsible in improving the process without depending on the developers. This feature is of particular significance when the system deployed in a different domains or application sites.

In one embodiment of the present invention, all extracted and disambiguated concepts 38 are presented to a user 52 on a web-based user interface, wherein text representing the concept 38 is highlighted. Alongside the highlighted text, the extracted and disambiguated concept 38 and its type are displayed. A typical user 52 is provided with two choices to indicate whether the extraction and disambiguation is correct (positive) or incorrect (negative). Based on the user selection, the appropriate vector set, positive or negative examples 26 and 28 are updated in the disambiguation module 14. The updated disambiguation module 14 is further used to extract concepts from any future texts.

Referring back to FIG. 1 and explaining in terms of representative modules and components, user feedback module 16 is coupled to the concept disambiguation module 14 and is configured to receive the disambiguated concept 38 from the concept disambiguation module 14. Further the user feedback module 16 validates the disambiguated concept with first manual input 62 received from a user 52, and generates either a retained concept 72 or a discarded concept 74. The retained concept 72 is supplied back to the concept disambiguation module 14 and added either to the number of positive example concepts 26 or the number of negative example concepts 28, based on a second manual input 64 received from the user 62.

In certain embodiments of the present invention, the text analysis system 10 is a computer based system having electrical circuitry configured to process input text 32 from the user interface 16. Further, the text analysis system 10 may include non-transitory, computer-readable medium storing instructions that, when executed by a computer processor, cause the computer processor to perform a method 200 of text analysis described in details below. For example, the text analysis system 10 may include processors, storage devices, and memory devices. The processor(s) may be used to execute software, such as text processing software, and so forth. Moreover, the processor(s) may include one or more microprocessors, such as one or more "general-purpose" microprocessors, one or more special-purpose microprocessors, and/or application specific integrated circuits (ASICS), or some combination thereof. For example, the processor(s) may include one or more reduced instruction set (RISC) processors.

The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., text data, etc.), instructions (e.g., software or firmware for processing text, etc.), and any other suitable data. The memory device(s) may include a volatile memory, such as random access memory (RAM), and/or a nonvolatile memory, such as ROM. The memory device(s) may store a variety of information and may be used for various purposes. For example, the memory device(s) may store processor-executable instructions (e.g., firmware or software) for the processor(s) to execute, such as instructions for a text analysis software.

In certain embodiments, the text analysis system 10 may include a communication device (e.g., network interface, wireless communication module, etc.) configured to communicate (e.g., via wired or wireless signals) with a remote server or a cloud-based computer network, for example. In such embodiments, the text analysis system 10 may output signals indicative of the extracted concepts corresponding to the stream of input text 32. The remote server or network may store and/or process the signals to facilitate short-term and/or long-term text analysis. For example, the remote server or network may compare an extracted and disambiguated concept with previously stored database of positive concept examples and negative concept examples in order to identify confidence scores for the purpose of validation.

Figure 3:
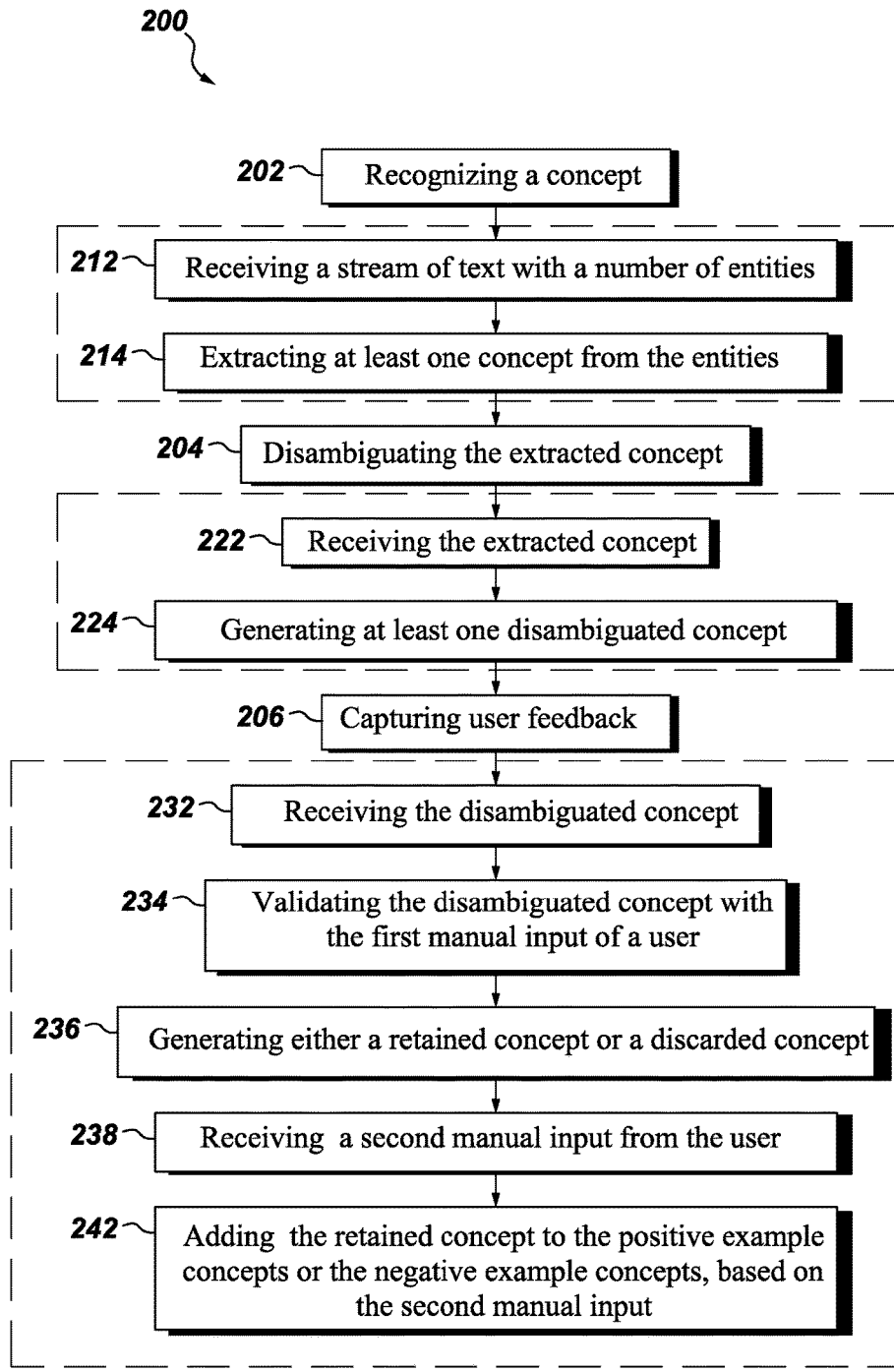
FIG. 3 illustrates a method of text analysis based on one embodiment of the present invention.

Turning to the drawings again, FIG. 3 illustrates a method of text analysis 200 based on one embodiment of the present invention. The method 200 includes recognizing a concept as in step 202. Recognizing a concept 202 includes receiving a stream of text 32 (FIG. 1) comprising a number of entities 34 (FIG. 1), as in 212. In one embodiment of the invention, in the step 212 of receiving a stream of text includes receiving a stream of unstructured text. In another embodiment of the invention, the input stream of text 32 comprises structured text received through various web-enabled standard forms. Recognizing a concept 202 also includes extracting concept 36 (FIG. 1) from the number of entities 34, as in 214.

The method 200 further includes disambiguating the extracted concept, as in 204. Disambiguating the extracted concept 36 includes receiving the extracted concept, as in 222 and generating disambiguated concept 38 (FIG. 1) corresponding to the extracted concept 36, as in 224. The disambiguating the extracted concept step 204 further includes comparing the extracted concept with each of the positive example concepts 26, and the negative example concepts 28. The generating disambiguated concept, as in 224 includes computing a confidence score 42 signifying a likelihood of correctness of the extracted concept. Computing a confidence score 42 comprises incorporating a comparison with each of the positive example concepts 26 and the negative example concepts 28.

The method 200 further includes capturing user feedback, as in 206. Capturing used feedback 206 includes receiving the disambiguated concept 28, as in 232, validating the disambiguated concept with a first manual input 62 received from a user 52, as in 234, and generating either a retained concept 72 or a discarded concept 74, as in 236. The step of capturing used feedback 232 further includes receiving a second manual input 64 from the user, as in 238; and adding the retained concept 72 to the positive example concepts 26 and the negative example concepts 28, based on the second manual input 64, as in 242.

Figure 4:
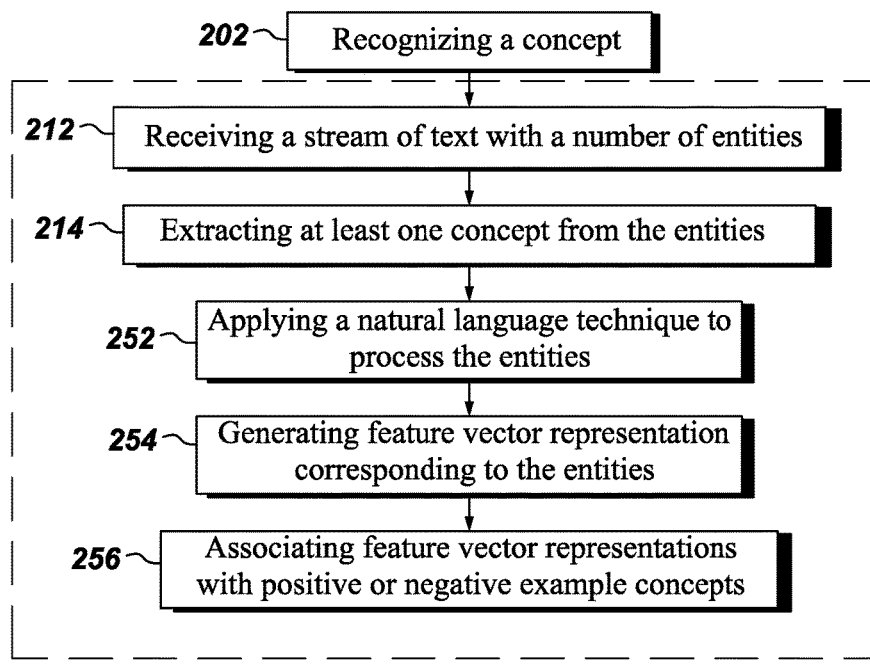
FIG. 4 illustrates an expanded view of the step of recognizing a concept of FIG. 3, based on one embodiment of the present invention.

FIG. 4 illustrates an expanded view of the step 202, recognizing a concept of FIG. 3, based on one embodiment of the present invention. The step 202, includes applying a natural language processing technique to process the number of entities 34, as in step 252 to generate the extracted concept 36, generating feature vector representation 86 corresponding to of the number of entities 34 linked to the extracted concept 36 in terms of a number of features 88 associated with the extracted concept, as in step 254; and associating the feature vector representation with either the number of positive example concepts 26 or the number of negative example concepts 28, as in step 256.

One non-liming technical advantage of the present invention is that the disambiguation system and method described herein are semi-automated and these typically use user feedback to actively improve the disambiguation module. Specifically, the feedback-based mechanism acts as a way to disambiguate concepts that can be used in different contexts through the collection of positive and negative examples. This approach is aimed to reduce the number of false positives when only the ontologies are applied to the input text as dictionaries. The current approach further involves a text processing step wherein syntactic and semantic features are generated to form a vector representation of the entities in the feature vector generation step. Furthermore, the confidence score assigned to each of the entities during the disambiguation step, reflects the likelihood of correctness for an entity to be linked to a particular concept in the ontologies.

Another non-liming technical advantage of the present invention is that the disambiguation module is decoupled from the concept recognition algorithm. In other words, the disambiguation module can be paired with any given concept recognition algorithm and thereby used in a number of different domains. This independent configuration of the disambiguation module alleviates the dependency on developers to update the system through user feedback. One commercial advantage of this approach is that it reduces the cost of maintaining systems by enabling users to continually improve the accuracy of their version of the algorithm with use and feedback. In other words, current configurations of the systems and methods described herein help build better concept recognition modules for a variety of domains in shorter periods of time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of text analysis comprising:
applying a natural language processing technique for recognizing an ontological concept, by a concept recognition module, the recognizing comprising:
receiving a stream of text comprising a plurality of entities;
extracting at least one concept from said plurality of entities;
disambiguating said at least one extracted concept, by a concept disambiguation module, comprising:
receiving said at least one extracted concept;
generating at least one disambiguated concept corresponding to said at least one extracted concept, wherein generating the at least one disambiguated concept comprises computing a confidence score signifying a likelihood of correctness of the at least one extracted concept, and further wherein the computing a confidence score comprises incorporating a comparison with each of: a plurality of positive example concepts and a plurality of negative example concepts, wherein the disambiguating the at least one extracted concept comprises comparing the at least one extracted concept with each of: the plurality of positive example concepts, and the plurality of negative example concepts;
capturing user feedback, comprising:
receiving said at least one disambiguated concept;
validating said disambiguated concept with a first manual input received from a user;
generating at least one of: a retained concept and a discarded concept;
and
updating the concept disambiguation module based on the at least one disambiguated concept and a second input from the user.

2. The method of claim 1, wherein said generating at least one disambiguated concept comprises computing a confidence score signifying a likelihood of correctness of said at least one extracted concept.

3. The method of claim 2, wherein said computing a confidence score comprises incorporating a comparison with each of: said plurality of positive example concepts and said plurality of negative example concepts.

4. The method of claim 1, wherein said recognizing the ontological concept further comprises:
processing said plurality of entities by applying the natural language processing technique to generate said at least one extracted concept;
generating feature vector representation corresponding to at least one of the plurality of entities linked to said at least one extracted concept in terms of a plurality of features associated with said extracted concept; and
associating said vector representation with at least one of: said plurality of positive example concepts and said plurality of negative example concepts.

5. The method of claim 1, wherein said receiving a stream of text comprises receiving a stream of unstructured text.

6. A system for text analysis comprising:
a concept recognition module configured to:
receive a stream of text comprising a plurality of entities, and;
extract at least one concept from said plurality of entities;
a concept disambiguation module independently coupled to said concept recognition module and configured to:
receive and disambiguate said at least one extracted concept;
generate at least one corresponding disambiguated concept corresponding to said at least one extracted concept, wherein the generating at least one disambiguated concept comprises computing a confidence score signifying a likelihood of correctness of the at least one extracted concept, and further wherein the computing a confidence score comprises incorporating a comparison with each of: a plurality of positive example concepts and a plurality of negative example concepts, wherein the disambiguating the at least one extracted concept comprises comparing the at least one extracted concept with each of: the plurality of positive example concepts, and the plurality of negative example concepts;
a user feedback module coupled to the concept disambiguation module and configured to:
receive the at least one disambiguated concept;
validate the disambiguated concept with a first input received from a user;
generate at least one of: a retained concept and a discarded concept; and
update the concept disambiguation module based on the at least one corresponding disambiguated concept and a second input received from the user.

7. The system of claim 6, wherein said concept disambiguation module computes a confidence score signifying a likelihood of correctness of said at least one extracted concept to generate said at least one corresponding disambiguated concept.

8. The system of claim 7, wherein said confidence score incorporates a comparison with each of: said plurality of positive example concepts and said plurality of negative example concepts.

9. The system of claim 6 further comprising a user feedback module coupled to said concept disambiguation module and configured to: receive said disambiguated concept from said concept disambiguation module; validate said disambiguated concept with first input received from a user, and generate at least one of: a retained concept and a discarded concept.

10. The system of claim 9, wherein said retained concept is supplied back to said concept disambiguation module and added to at least one of: said plurality of positive example concepts and said plurality of negative example concepts, based on a second manual input received from said user.

11. The system of claim 6, wherein said concept recognition module further comprises:
a text processing component configured to:
process said plurality of entities applying a natural language processing technique; and
extract said at least one concept;
a feature vector generating component configured to:
receive said extracted concept from said text processing component;
generate feature vector representation corresponding to at least one of the plurality of entities linked to said at least one extracted concept in terms of a plurality of features associated with said extracted concept; and
associate said vector representation with at least one of: said plurality of positive example concepts and said plurality of negative example concepts.

12. The system of claim 6, wherein said text comprises unstructured text.

13. A non-transitory, computer-readable medium storing instructions that, when executed by a computer processor, cause the computer processor to perform a method of text analysis comprising:
applying a natural language processing technique for recognizing an ontological concept by a concept recognition module, the recognizing comprising:
receiving a stream of text comprising a plurality of entities;
extracting at least one concept from said plurality of entities;
disambiguating said at least one extracted concept, by a concept disambiguation module, comprising:
receiving said at least one extracted concept;
generating at least one disambiguated concept corresponding to said at least one extracted concept, wherein said generating at least one disambiguated concept comprises computing a confidence score signifying a likelihood of correctness of said at least one extracted concept, and further wherein said computing a confidence score comprises incorporating a comparison with each of: said plurality of positive example concepts and said plurality of negative example concepts, wherein said disambiguating said at least one extracted concept comprises comparing said at least one extracted concept with each of: a plurality of positive example concepts, and a plurality of negative example concepts;

capturing user feedback, comprising:
  receiving said at least one disambiguated concept;
  validating said disambiguated concept with a first input received from a user; and
  generating at least one of: a retained concept and a discarded concept; and
updating the concept disambiguation module based on the at least one disambiguated concept and a second input received by the user.

14. The medium of claim 13, further comprising:
receiving the second input from the user; and
adding said retained concept to at least one of: said plurality of positive example concepts and said plurality of negative example concepts, based on said second input.

15. The medium of claim 13, wherein said recognizing the ontological concept further comprises:
  processing said plurality of entities by applying the natural language processing technique to generate said at least one extracted concept;
  generating feature vector representation corresponding to at least one of the plurality of entities linked to said at least one extracted concept in terms of a plurality of features associated with said extracted concept; and
  associating said vector representation with at least one of: said plurality of positive example concepts and said plurality of negative example concepts.

\* \* \* \* \*